(12) United States Patent
Dunning et al.

(10) Patent No.: US 8,156,059 B2
(45) Date of Patent: Apr. 10, 2012

(54) INDICATOR-BASED RECOMMENDATION SYSTEM

(76) Inventors: Ted E. Dunning, San Diego, CA (US); Raza Amir Mobin, San Diego, CA (US)

( * ) Notice: Subject to any disclaimer, the term of this patent is extended or adjusted under 35 U.S.C. 154(b) by 990 days.

(21) Appl. No.: 12/023,597

(22) Filed: Jan. 31, 2008

(65) Prior Publication Data

US 2008/0189232 A1    Aug. 7, 2008

Related U.S. Application Data

(60) Provisional application No. 60/887,813, filed on Feb. 2, 2007.

(51) Int. Cl.
*G06N 5/00* (2006.01)
(52) U.S. Cl. ......................................................... 706/45
(58) Field of Classification Search ...................... 706/45
See application file for complete search history.

(56) References Cited

U.S. PATENT DOCUMENTS

| | | | |
|---|---|---|---|
| 7,698,331 | B2 | 4/2010 | Carson et al. |
| 7,739,221 | B2 | 6/2010 | Lawler et al. |
| 7,827,170 | B1 | 11/2010 | Horling et al. |
| 2003/0046689 | A1 | 3/2003 | Gaos |
| 2004/0083232 | A1 | 4/2004 | Ronnewinkel et al. |
| 2004/0117442 | A1 | 6/2004 | Thielen |
| 2006/0224857 | A1 | 10/2006 | Zamir et al. |
| 2006/0235778 | A1 | 10/2006 | Razvi et al. |
| 2007/0055646 | A1 | 3/2007 | Zeng et al. |
| 2007/0255755 | A1 | 11/2007 | Zhang et al. |
| 2008/0086688 | A1 | 4/2008 | Chandratillake et al. |
| 2008/0091670 | A1 | 4/2008 | Ismalon |

FOREIGN PATENT DOCUMENTS

KR    1020050095230    9/2005

OTHER PUBLICATIONS

Stumme, Semantic Web Mining State of the art and future directions, Web Semantics: Science, Services and Agents on the World Wide Web 4 (2006), pp. 124-143.*
"FastTrack", pp. 1-2, (Kazaa protocol), Wikipedia. Retrieved from: http://en.wikipedia.org/wiki/FastTrack.
Linden, Greg, et al., "Amazon.com Recommendations: Item-to-Item Collaborative Filtering", IEEE Internet Computing, vol. 7, Issue 1 (Jan. 2003), pp. 76-80.
"BitTorrent Protocol Specification v1.0", pp. 1-20. Retrieved from: http://wiki.theory.org/BitTorrentSpecification.
"Cryptographic hash function", pp. 1-8, Wikipedia. Retrieved from: http://en.wikipedia.org/wiki/Cryptographic_hash_function.

(Continued)

*Primary Examiner* — Wilbert L Starks
(74) *Attorney, Agent, or Firm* — Raubvogel Law Office

(57) ABSTRACT

A recommendation system and method uses data structured according to an indicator-based recommendation paradigm. Items to be considered for recommendation are stored in a text retrieval system, along with associated meta-data such as title and description. To these conventional characteristics are added additional characteristics known as indicators which are derived from an analysis of the usage of the system by users. This indicator-based system provides a more robust recommendation system that is able to capture a greater depth and variety of real-world relationships among items, and is able to handle p-adic systems and systems with ternary or higher relations.

37 Claims, 4 Drawing Sheets

OTHER PUBLICATIONS

MacKay, David, "Information Theory, Inference and Learning Algorithms", Cambridge University Press, 2003, pp. 1-2. Retrived from: http://www.inference.phy.cam.ac.uk/mackay/itila/book.html.

Yang, Richard and Lam, Simon S., "General AIMD Congestion Control", Universtiy of Texas Computer Science Department Technical Report, Austin, TX, TR-2000-09, May 9, 2000, pp. 1-34. Retrieved from: http://www.cs.utexas.edu/users/lam/Vita/Misc/YangLam00tr.pdf.

"Gnutella", pp. 1-5, Wikipedia. Retrieved from: http://en.wikipedia.org/wiki/Gnutella.

"Hypertext Transfer Protocol—HTTP/1.2", pp. 1-6. Retrieved from: http://www.w3.org/Protocols/rfc2616/rfc2616.html.

"Internet Protocol, Darpa Internet Program Protocol Specification", Sep. 1981, pp. 1-45. Retrieved from: http://www.ietf.org/rfc/rfc0791.txt.

"Long Tail", p. 1, Wikipedia. Retrieved from: http://en.wikipedia.org/wiki/Long_tail.

Luby, Michael G., et al., "Improved Low-Density Parity-Check Codes Using Irregular Graphs and Belief Propagation", In Proceedings of the IEEE International Symposium on Information Theory, pp. 1-9.

Luby, Michael G., "Efficient Erasure Correcting Codes", IEEE Transactions on Information Theory, Feb. 2001, vol. 47, No. 2, pp. 569-584.

Luby, Michael, "LT Codes", Proceedings of the 43rd Annual IEEE Symposium on Foundations of Computer Science, Nov. 16-19, 2002, pp. 271-282.

"MusicMatch Unveils New Subscription Radio Service". Retrieved from: http://www.streamingmedia.com/article.asp?id=7282.

"Network address translation", pp. 109, Wikipedia. Retrieved from: http://en.wikipedia.org/wiki/Network_address_translation.

Ripeanu, Matei, et al., "Mapping the Gnutella Network: Properties of Large-Scale Peer-to-Peer Systems and Implications for System Design", Computer Science Dept., The University of Chicago, Chicago, IL, pp. 1-12.

Jacobson, V., et al., "TCP Extensions for High Performance", Cray Research, May 1992, pp. 1-32. Retrieved from: http://www.ietf.org/rfc/rfc1323.txt.

Allman, M., et al., "TCP Congestion Control", Apr. 1999, pp. 1-14. Retrieved from: http://www.ietf.org/rfc/rfc2581.txt.

"Secure Hash Standard", Federal Information Processing Standards Publication 180-1, Apr. 17, 1995, pp. 1-17. Retrieved from: http://www.itl.nist.gov/fipspubs/fip180-1.htm.

"Simple traversal of UDP over NATS", (STUN), pp. 1-4, Wikipedia. Retrieved from: http://en.wikipedia.org/wiki/STUN.

Soccolofsky, T. and Kale, C., "A TCP/IP Tutorial", Spider Systems Limited, Jan. 1991, pp. 1-25. Retrieved from: http://www.ietf.org/rfc/rfc180.txt.

"RFC761- DoD standard Transmission Control Protocol", Jan. 1980, pp. 1-61. Retrieved from: http://www.faqs.org/rfcs/rfc761.html.

Postel, J., "RFC768—User Datagram Protocol", Aug. 28, 1980, pp. 1-4. Retrieved from: http://www.faqs.org/rfcs/rfc768.html.

Buntine, Wray and Jakulin, Aleks, "Discrete Component Analysis", Helsinki Institute for Information Technology, Dept. of Computer Science, University of Helsinki, Finland. Retrieved from: http://citeseerx.ist.psu.edu/viewdoc/summary?doi=10.1.1.5.313.

Berry, Michael and Linoff, Gordon, "Data Mining Techniques: For Marketing, Sales, and Customer Support" Wiley, 1st edition, 1997. ISBN-10: 0471179809. Retrieved from: http://www.wiley.com/WileyCDA/WileyTitle/productCd-0471179809.html.

Blei, David, et al., "Latent Dirichlet Allocation", Journal of Machine Learning Research, Jan. 2003. Retrieved from: http://www.cs.princeton.edu/~blei/papers/BleiNgJordan2003.pdf.

Buntine, Wray and Jakulin, Aleks, "Applying Discrete PCA in Data Analysis", 2004. Retrieved from: http://www.hiit.fi/~buntine/uai2004buntine.pdf.

Caid, William R., et al., William R. Caid, Susan T. Dumais, and Stephen I. Gallant. "Bellcore's Latent Semantic Indexing (LSI) system and HNC's MatchPlus system represent", Learned vector-space models for document retrieval. Information Processing and Management, 31(3):419-429, 1995. Retrieved from: http://citeseer.ist.psu.edu/7470.html.

Deerwester, Scott, et al., "Indexing by latent semantic analysis", Journal of the American Society of Information Science, 41(6):391-407, 1990. Retrieved from: http://lsi.research.telcordia.com/lsi/papers/JASIS90.pdf.

Dunning, Ted E., Accurate methods for the statistics of surprise and coincidence. Computational Linguistics, 19 (1):61-74, 1993. Retrieved from: http://citeseerx.ist.psu.edu/viewdoc/summary?doi=10.1.1.14.5962.

Van Loan, Charles F., "Matrix Computations (Johns Hopkins Studies in Mathematical Sciences)",The Johns Hopkins University Press, 3rd edition, 1996. Retrieved from: http://www.amazon.com/Computations-Hopkins-Studies-Mathematical-Sciences.

Hofman, Thomas, "Probabilistic latent semantic analysis", In Proc. of Uncertainty in Artificial Intelligence, UAI'99, Stockholm, 1999. Retrieved from: http://www.cs.brown.edu/~th/papers/Hofmann-UAI99.pdf.

Hofmann, Thomas, et al., "Learning from Dyadic Data", Center for Biological and Computational Learning, M.I.T., Cambridge, MA, 1999. Retrieved from: http://www.cs.berkeley.edu/~jordan/papers/dyadic.pdf.

Jordan, Michael I., et al., "An introduction to Variational Methods for Graphical Models", Machine Learning, 37 (2):183-233, 1999. Retrieved from: http://www.cs.berkeley.edu/~jordan/papers/variational-intro.pdf.

Neal, R.M., Probabilistic inference using Markov chain Monte Carlo methods. Technical Report CRG-TR-93-1, University of Toronto, 1993. Retrieved from: http://citeseer.ist.psu.edu/neal93probabilistic.html.

Resnick, P., et al., "GroupLens: An Open Architecture for Collaborative Filtering of Netnews". In Proceedings of ACM 1994 Conference on Computer Supported Cooperative Work, pp. 175-186, Chapel Hill, North Carolina, 1994. ACM. Retrieved from: http://citeseer.ist.psu.edu/resnick94grouplens.html.

Salton, Gerard, "Developments in Automatic Text Retrieval", Science, 253:974-980, 1991.

Shardanand, Upendra, et al., "Social information filtering: Algorithms for automating and quot; word of mouth", In Proceedings of ACM CHI'95 Conference on Human Factors in Computing Systems, vol. 1, pp. 210-217, 1995. Retrieved from: http://citeseer.ist.psu.edu/195430.html.

Xu, G., Zhang, Y., Ma, J. and Zhou, X., "Discovering User Access Pattern Based on Probabilistic Latent Factor Model", in Proceedings of the Sixteenth Australasian Database Conference, Newcastle, Australia, 2005, vol. 39, pp. 27-35.

Li, Haoyuan, et al., "PFP: Parallel FP-Growth for Query Recommendation".

Turnbull, Douglas, et al., "Modeling Music and Words Using a Multi-Class Naive Bayes Approach". International Conference on Music Information Retrieval (ISMIR), Oct. 2006; http://cosmal.ucsd.edu/cal/pubs/ModelingMusicAndWords.pdf.

Sulzer, Tom, "Moodlogic". Retrieved from: http://en.wikipedia.org/wiki/MoodLogic.

Brin, Sergey, et al., "The Anatomy of a Large-Scale Hypertextual Web Search Engine". Computer Networks and ISDN Systems, 30(1-7):107-117, 1998. http://infolab.stanford.edu/pub/papers/google.pdf.

Bennett, James, et al., "The Netflix Prize". In Proceedings of KDD Cup and Workshop 2007.

Hofmann, Thomas, et al., "Unsupervised Learning From Dyadic Data". Technical Report TR-98-042, International Computer Science Institute, Berkeley, CA, 1998. http://citeseerx.ist.psu.edu/viewdoc/download?doi=10.1.1.46.2857&rep=rep1&type=pdf.

Van Reijsbergen, "Chapter 5: Search Strategies", in Information Retrieval, 2nd edition, 1979. Retrieved from http://www.dcs.gla.ac.uk/Keith/Chapter.5/Ch.5.html.

Hearst, Marti, "User Interfaces and Visualization", in Modern Information Retrieval, 1999 (pp. 257-323). Retrieved from http://people.ischool.berkeley.edu/~hearst/irbook/chapter/chap10.html.

Wang, Xuanhui, et al., "Latent Semantic Analysis for Multiple-Type Interrelated Data Objects", Proceedings of the 29th Annual International ACM SIGIR Conference on Research and Development in Information Retrieval, SIGIR '06, Jan. 1, 2006, p. 236, XP55004453, New York, New York, USA.

Wang, J., et al., "Unified Relevance Models for Rating Prediction in Collaborative Filtering", ACM Transactions on Information Systems, vol. 26, No. 3, Article 16, Jun. 2008, XP-002656571, USA.

* cited by examiner

INDICATOR-BASED RECOMMENDATION SYSTEM

CROSS-REFERENCE TO RELATED APPLICATIONS

The present patent application claims priority from U.S. Provisional Patent Application Ser. No. 60/887,813, filed Feb. 2, 2007, for "Finding Patterns of Usage", which is incorporated herein by reference.

FIELD OF THE INVENTION

The present invention is related to recommendation systems, and more particularly to techniques for improving scalability and performance in such systems by using an indicator-based data structure.

DESCRIPTION OF THE BACKGROUND ART

Since the discovery of the Internet by the general public in the early 90's and the subsequent widespread advent of consumer electronic commerce mediated by the World Wide Web in the mid and late 90's, recommendation systems have become relatively commonplace. These systems are used to select products for display to consumers as they browse web sites and are generally based on some sort of analysis of the purchasing and/or browsing behavior of consumers visiting the site.

As e-commerce has become more prevalent, more and more data has become available for recommendation engines to analyze. These large amounts of data improve the robustness of results, but create scalability problems. Furthermore, the complexity of the interactions represented in the data has the potential to increase dramatically. Existing systems often ignore such complexities, focusing on a model that embodies a radical simplification of the actual relationships and interactions among entities. Thus, most conventional systems generate models that operate in terms a single kind of interaction between one kind of active agent (the consumer) and one kind of object (books, music, web pages or video as the case might be). This simplification is used by conventional systems to provide reasonable recommendations using standard mathematical techniques when large amounts of data are available. However, such a simplification can yield substandard results, and can limit the flexibility and power of the recommendation system.

Dyadic Learning Techniques

Many conventional recommendation systems approach the problem of recommendation by constructing a bipartite set containing two kinds of objects, X and Y related by a single relation. In these systems, training data $T=\{(x_i,y_i,k_i)\}$ is provided, where $x_i \in X$, $y_i \in Y$ and $k_i \in R$. The value $k_i$ is an optional association strength. An input $Z=\{z_i\}$ is provided, where $z_i \in Y$. The training data can be viewed as a rowsets $T_{x_i}=\{y_i|(x_i, y_i) \in T\}$ that are sampled from some multinomial distribution with parameters $P(y_i)$. In terms of viewing, listening or buying histories, $P(y)$ represents the probability that a viewer, listener or buyer will take the desired action on y. In general, it is beneficial (i.e., it would increase the total number of views or purchases and increase general user interest) to present y's having large values of $P(y)$ to users.

The goal of the recommendation system is to produce a result set $R=\{r_m\} \subset Y$ such that $P(r_m)$ is large. The elements of the set R are the recommended items. This is similar to the formulation described in, for example, T. Hofmann, J. Puzicha, and M. Jordan, *Learning from dyadic data*, 1999.

The dyadic learning framework appears in many applications. In text retrieval, the two kinds of objects are words and documents. The relation is whether a word appears in a document; recommendation is text retrieval with relevance feedback, as described, for example, in Jr. J. J. Rocchio, "Relevance feedback in information retrieval," in Gerard Salton, editor, *The SMART Retrieval System*, pages 313-323, Prentice Hall, Englewood Cliffs, N.J., 1971. In music recommendation systems, the two kinds of objects are listeners and artists, and the relation represented is "who listened to whose music?". In advertising analysis systems, the two kinds are consumers and vendors, with the relation being "who purchased from whom?" or (for web visitors and ads), "who clicked on what?". In eCommerce systems, consumers and products are the kinds of objects, and the relation is "who bought what". See, for example, Greg Linden, Brent Smith, and Jeremy York, "Amazon.com recommendations: Item-to-item collaborative filtering," *IEEE Internet Computing*, 7(1): 76-80, January/February 2003. All of these diverse systems are variants of the same general pattern in which objects of one kind interact with object of another in exactly one way.

Dyadic learning approaches in the past have generally fallen into the category of matrix-based, item-based, or nearest-neighbor techniques.

Matrix-Based Learning Techniques

Matrix-based techniques express subsets of X and Y as vectors with an element for each member of the set and length equal to the cardinality of the set. The training data T is expressed as a matrix with rows corresponding to elements of X, columns corresponding to elements of Y, $$t_{xy} = \begin{cases} k & \text{if } (x, y, k) \in T \\ 0 & \text{otherwise} \end{cases}$$

The goal in matrix-based methods is to use T to find a function A, such that r=Az. In practice, Az is often more or less a matrix product, although it is only rarely implemented with an explicit matrix using a matrix algebra package. Traditional vector-based text retrieval [Sal91], as the name suggests, uses a suitably weighted and normalized version of T itself so that $A=D_{doc}TD_{term}$ where $D_{doc}$ and $D_{term}$ are diagonal matrices that perform document normalization or term weighting, respectively. See, for example, Gerard Salton, "Developments in automatic text retrieval," in *Science*, 253: 974-980, 1991.

Latent Variable Techniques

Latent variable techniques are matrix-based recommendation systems in which A is implemented using a reduced dimensionality decomposition of some kind. One such method is latent semantic analysis (LSA), as described in Scott C. Deerwester, Susan T. Dumais, Thomas K. Landauer, George W. Furnas, and Richard A. Harshman, "Indexing by latent semantic analysis," in *Journal of the American Society of Information Science*, 41(6):391-407, 1990. LSA was originally applied to text retrieval where the $k_i$ were defined as co-occurrence frequencies weighted by inverse document frequency and the matrix product used was the traditional product from linear algebra. The weighted term matrix $A=D_{doc}TD_{term}$ is decomposed using singular value decomposition, $$A \approx U\Sigma_n V'$$

where $\Sigma_n$ contains only the largest n singular values.

Text retrieval with LSA is done by computing document scores $(U\Sigma_n V')z$. LSA can be used in any dyadic learning problem and recommendation can be done with LSA by taking r as the largest elements of the vector A'Az=VΣU'UΣV'z=VΣ²V'z. Notably, this product can be computed in various orders. For latent variable techniques, it is common to use (VΣ)((ΣV')z). This converts z to the reduced dimensional representation using (ΣV')z and then converts back to items using VΣ.

HNC Software achieved similar results with their so-called context vectors, as described in William R. Caid, Susan T. Dumais, and Stephen I. Gallant, "Learned vector-space models for document retrieval," in *Information Processing and Management*, 31(3):419-429, 1995. In the context vector system, X consisted of documents and Y of words. Words were assigned random values from $R^n$ where n was typically chosen to be ~300, and training epochs were conducted with words being assigned new vectors constructed from the vectors of the words occurring in the same document. The context vector system can be seen as similar to LSA since executing t steps of the HNC training algorithm was effectively computing $X^{(t)}=(A'A)^t X^{(0)}$ where $X^{(0)}$ is an n column matrix containing random initial word vectors as rows each normalized so that $X^{(0)'}X^{(0)}=I$. The relationship with LSA can be seen from $$(A'A)^t X^{(0)} = (V\Sigma U' U\Sigma V')^n X^{(0)} = V\Sigma^{2t} V' X^{(0)}$$

As n gets large, the largest few singular values dominate all others so $X^{(t)} \approx V\Sigma_1^{2t}V'$. The HNC group used a variety of early stopping rules or "repulsion" rules. These rules have the effect of partially orthogonalizing the resulting vectors in $X^{(t)}$, which forces the learning algorithm to find more than just the first singular vector. Analogous orthogonalization (with better understood effect) is used in Lanczos algorithm, described in, for example, Gene H. Golub and Charles F. Van Loan, *Matrix Computations*, Johns Hopkins Studies in Mathematical Sciences, The Johns Hopkins University Press, 3rd edition, 1996.

More recently, the original motivation for LSA in terms of smoothing the training matrix T has been reinterpreted in work by Buntine and Jakulin (discrete component analysis or DCA) and Hoffman, Ng, Blei and Jordan (probabilistic LSI or pLSI and latent Dirichlet allocation or LDA). See, for example, Wray Buntine and Aleks Jakulin, *Discrete component analysis*; W. Buntine, *Applying discrete PCA in data analysis*, 2004; Thomas Hofmann, "Probabilistic latent semantic analysis," in *Proc. of Uncertainty in Artificial Intelligence*, UAI'99, Stockholm, 1999; and D. Blei, A. Ng, and M. Jordan, "Latent dirichlet allocation," in *Journal of machine Learning Research* 3, 2003.

In this work, a decomposition similar to that used in LSA is used, except that the singular vectors in U and V are interpreted as conditional probabilities of a hidden multinomial factor. The reduced representations for documents or words in these approaches are the parameters of the multinomial distribution of this hidden factor, and the metric of approximation is no longer the $L_2$ norm but is instead based on log-likelihood or log-evidence. Where the singular vectors in LSA were taken as orthonormal vectors from $R^d$, in DCA, pLSI and LDA the representation vectors are restricted to the unit simplex. It is interesting to note that the probability that samples a and b from two multinomials with parameters $\theta_a$ and $\theta_b$ are equal is just $$p(a=b|\theta_a, \theta_b) = \sum_x p(a=x|\theta_a)p(b=x|\theta_b) = \sum_i \theta_{ai}\theta_{bi}$$

Similarly, if $\theta_a$ and $\theta_b$ are Dirichlet distributed with parameters $\alpha_a m_a$ and $\alpha_b m_b$ respectively, then $$p(a=b|\alpha_a, m_a, \alpha_b, m_b) =$$
$$\int p(a=b|\theta_a, \theta_b)p(\theta_a|\alpha_a, m_a)p(\theta_b|\alpha_b, m_b)d\theta_a d\theta_b = \sum_i m_{ai}m_{bi}$$

The fact that these probabilities can be expressed in the form of sums of products makes much of the machinery in a practical LDA or DCA system very similar to that of an LSA-based system. Moreover, LDA and DCA can be viewed as alternative methods for approximating the same posterior probabilistic representation, and the differences between these methods have primarily to do with how the conditional probabilities are estimated. The LDA work highlights the variational approach of Jordan and others in variational techniques while the DCA work makes use of Gibbs sampling. See, for example, Michael I. Jordan, Zoubin Ghahramani, Tommi Jaakkola, and Lawrence K. Saul, "An introduction to variational methods for graphical models," in *Machine Learning*, 37(2):183-233, 1999; and R. M. Neal, "Probabilistic inference using Markov chain Monte Carlo methods," in Technical Report CRG-TR-93-1, University of Toronto, 1993. Jakulin and Buntine have provided a comprehensive framework that makes the relationships between these methods clear; see Buntine and Jakulin.

Nearest-Neighbor Recommendations

Nearest-neighbor techniques use various methods to find rows from the training data $R(x_j)=\{y|(x_j, y) \in T\}$ that are similar to z. Frequently occurring elements of these neighboring rowsets are then used to form the recommendation set. Just as the matrix-based techniques require a suitable matrix product, nearest-neighbor techniques require a suitable similarity measure.

Nearest-neighbor recommendations thus produce item recommendations for a user by using the user's history to find similar users and then examining those users to determine which items they interacted with anomalously often. Early examples of nearest-neighbor techniques include the Ringo system for music recommendation and the GroupLens system. See, for example, Upendra Shardanand and Patti Maes, "Social information filtering: Algorithms for automating 'word of mouth,'" in *Proceedings of ACM CHI'95 Conference on Human Factors in Computing Systems*, volume 1, pages 210-217, 1995; and P. Resnick, N. Iacovou, M. Suchak, P. Bergstorm, and J. Riedl, "GroupLens: An Open Architecture for Collaborative Filtering of Netnews," in *Proceedings of ACM 1994 Conference on Computer Supported Cooperative Work*, pages 175-186, Chapel Hill, N.C., 1994. ACM Nearest-neighbor recommendation systems can be difficult to implement in real-time settings since the set of users tends to grow faster than the set of items. These difficulties were the motivation for groups adapting market basket analysis to produce item-based recommendation systems. Item-based recommendation systems are described below.

Item Based Recommendations

The item-based recommendation system as described by Linden et al. uses a pre-processing step to derive item-to-item recommendations. Then, when recommending items for a user, the item-to-item recommendation lists for the items in the history vector z are merged to produce a recommendation list for the user.

Item-based recommendation systems are, in fact, simply a special case of market basket analysis, as described in Michael J. A. Berry and Gordon Linoff, *Data Mining Techniques: For Marketing, Sales, and Customer Support*, Wiley, 1st edition, 1997. ISBN-10: 0471179809. The key feature of all market basket analyses is the creation of item sets based on co-occurrence within the set of items that users have interacted with. In market basket analysis, the interaction is a purchase, but in other applications, the interaction might involve viewing a video or clicking on a search result. These item sets are combined by merging to produce a recommendation.

The methods used to produce item-sets generally reduce to the examination of the co-occurrence matrix T'T. This matrix is examined (in a sparse representation) to find elements that do not appear to be due to chance, usually by performing a statistical test on the elements. One suitable test of this sort makes use of the $G^2$ statistic, as described in Ted E. Dunning, "Accurate methods for the statistics of surprise and coincidence," in *Computational Linguistics*, 19(1):61-74, 1993. Examination of the weighted co-occurrence matrix A'A can provide similar results if the weighting factors are chosen appropriately. Those items in each row of the coocurence that are deemed most important are retained. The result is a sparse matrix $S \sim T'T$ that can be used to produce an item recommendation $r=Sz$.

The Problem: p-adic and Multitransitive Learning

In practice, the restriction to dyadic learning limits the capabilities of a recommendation system. As a concrete example, consider a situation where publishers add content items to a content management system. Viewers then may view these content items. Viewers may also forward content items to other viewers. Viewers may also add tags to content items. Exactly what kind of content we are dealing with in this example is not important; videos, pictures, music, books or other items are all plausible.

This example can be formalized by using the following two binary relations and two ternary relations, publish(p,c)
view(v,c)
forward($v_1$,c,$v_2$)
tag(v,c,t)

where we use p, c, v, and t to represent members of the corresponding sets P, C, V and T of publishers, content items, viewers and tags respectively. We might also extend these relations to be integer-valued functions if we wish to record the number of times an event has happened over a particular interval of time. In either case, we can represent these relations as the two and three dimensional matrices $P_{pc}$, $V_{vc}$, $F_{v_1 c v_2}$, and $T_{vct}$. A three-dimensional matrix is a data structure analogous to a conventional matrix, but with three indices rather than the more conventional two. Three dimensional matrices are sometimes referred to as data cubes.

As with dyadic learning, we consider the data in these matrices to be sampled from a distribution that we would like to estimate. Note, however, that because we have more than two sets of objects (we have four, in fact), a normal matrix cannot be used to represent the training data, nor can it reasonably be expected to be useful in estimating the distribution. Moreover, even if we restrict ourselves to considering a single relation, the forward and tag relations are not even binary and thus even in isolation, they cannot be well modeled by a normal matrix. In mathematical terminology, the learning problem is no longer dyadic, but is now tetradic (normally written 4-adic or p-adic in the general case) because we have four classes of objects. In linguistic terms, the forward and tag relations represent bitransitive verbs as opposed to the transitive verbs represented by publish and view. It is exactly this bitransitivity that makes normal matrix representations and all of the techniques based on them infeasible.

Even if this system were composed only of binary relations, however, it would be only be possible to represent the training data using adjoined matrices. For instance the publish and view relations above could be represented by two adjoined matrices, $$T = \begin{pmatrix} T_{publish} & 0 \\ 0 & T_{view} \end{pmatrix}$$

This would allow recommendation methods based on decomposition to be applied to the adjoined training data, $$T = \begin{pmatrix} U_{publish} \Sigma_{publish} V'_{publish} & 0 \\ 0 & U_{view} \Sigma_{view} V'_{view} \end{pmatrix}$$
$$= \begin{pmatrix} U_{publish} & 0 \\ 0 & U_{view} \end{pmatrix} \begin{pmatrix} \Sigma_{publish} & 0 \\ 0 & \Sigma_{view} \end{pmatrix} \begin{pmatrix} V_{publish} & 0 \\ 0 & V_{view} \end{pmatrix},$$

The co-occurrence matrix is also straightforward to compute with this system, $$T'T = \begin{pmatrix} T'_{publish} T_{publish} & 0 \\ 0 & T'_{view} T_{view} \end{pmatrix}$$

Unfortunately, this block-diagonal strategy of adjoining two dimensional matrices cannot represent certain relations. In particular, the item vectors that are derived by analyzing the publishing patterns have no relationship to the item vectors that are derived by analyzing the viewing patterns. Even worse, this strategy cannot be extended to the ternary relations such as tagging at all. This problem is inherent in the fact that two dimensional matrices have only two indices and thus are not at all suited to the representation of ternary relations.

What is needed is a system and method that avoids these limitations by providing for p-adic learning paradigms and thereby accounting for different types of relationships among entities. What is further needed is a recommendation system and method that provides improved scalability over prior art systems, without oversimplifying the data set.

SUMMARY OF THE INVENTION

The present invention addresses the above-listed limitations of prior art systems and presents a framework in which a large number of kinds of items can be described, and a large number of kinds of interactions can be modeled. The invention thus provides a more robust recommendation system that is able to capture a greater depth and variety of real-world relationships among items. As such, the present invention provides a mechanism for handling p-adic systems and systems with ternary or higher relations. This system also incorporates a number of performance- and accuracy-enhancing innovations.

According to the present invention, data is structured according to an indicator-based recommendation paradigm. Items to be considered for recommendation are stored in a text retrieval system, along with associated conventional meta-data such as title and description. To these conventional characteristics are added additional characteristics known as indicators which are derived from an analysis of the usage of the system by users.

The indicator-based recommendation methodology provides many of the performance benefits of item-based recommendation without requiring construction of the specialized data structures required to implement item-based recommendations. In one embodiment, the indicator-based recommendation paradigm of the present invention provides a practical way to encode reduced dimensional representations in a conventional indexed retrieval system, thereby allowing such systems to be scaled to larger problems than previously practical.

In some embodiments, the present invention also incorporates numerous adaptive characteristics that allow the system to improve accuracy over time without needing to record user profiles for off-line processing.

In some embodiments, the present invention also provides improved data presentation techniques to make the user more likely to make use of the recommended items.

SYSTEM ARCHITECTURE

Figure 2:
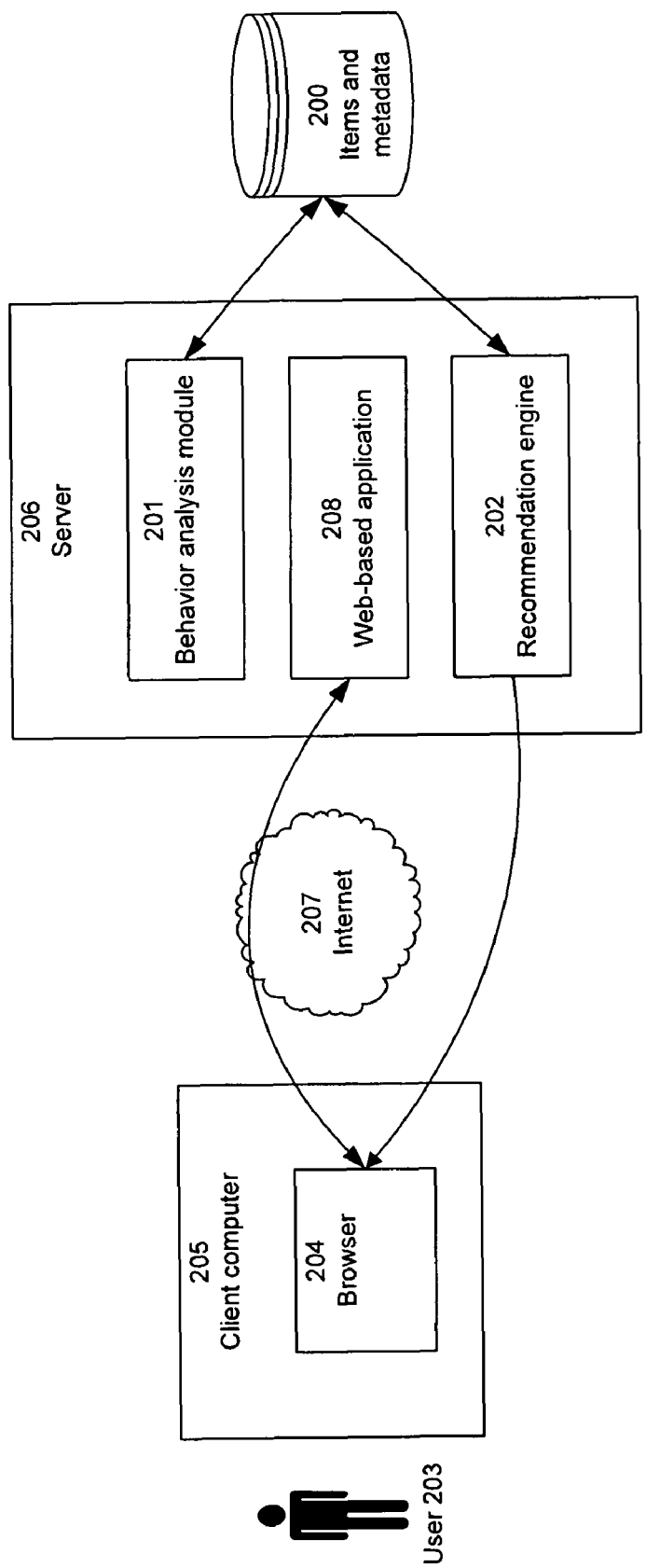
FIG. 2 is a block diagram depicting an overall system architecture for the present invention according to one embodiment.

Referring now to FIG. 2, there is shown a block diagram depicting an overall system architecture for the present invention according to one embodiment. In one embodiment, the present invention is implemented in a client/server environment, where users interact with a server via web browsers or other software applications running on client machines. The operational methods of the present invention are described below, and can be implemented using any workable functional architecture. For illustrative purposes, FIG. 2 depicts a behavior analysis module 201 for observing user behavior as a user 203 interacts with a web-based application. Module 201 stores items and metadata in database 200. Recommendation engine 202 generates recommendations for users 203 based on the stored information in database 200. Module 201 and engine 202 are depicted as operating on a server 206. However, one skilled in the art will recognize that such functional modules need not be separate entities, and that the techniques described herein can be implemented in a single processing entity for collecting behavior information and generating recommendations. Furthermore, such functional modules can be implemented on a single server, multiple servers, or other architecture. The present invention can thus be implemented in a distributed processing environment, if desired. Alternatively, the invention can be implemented on a stand-alone computer, kiosk, or other electronic device.

Furthermore, as depicted in FIG. 2, a user 203 interacts with the system of the present invention using a browser 204 running on a client computer 205. Computer 205 communicates with server 206 via the Internet 207. One skilled in the art will recognize that the present invention is not limited to any particular hardware platform. For example, it can be implemented using personal computers, personal digital assistants, cell phones, smartphones, handheld computers, kiosks, land-line telephones, televisions, game systems, and the like. The depiction of any particular physical architecture is intended to be illustrative and not limiting of the scope of the claimed invention.

Indicator-Based Recommendations

Figure 1:
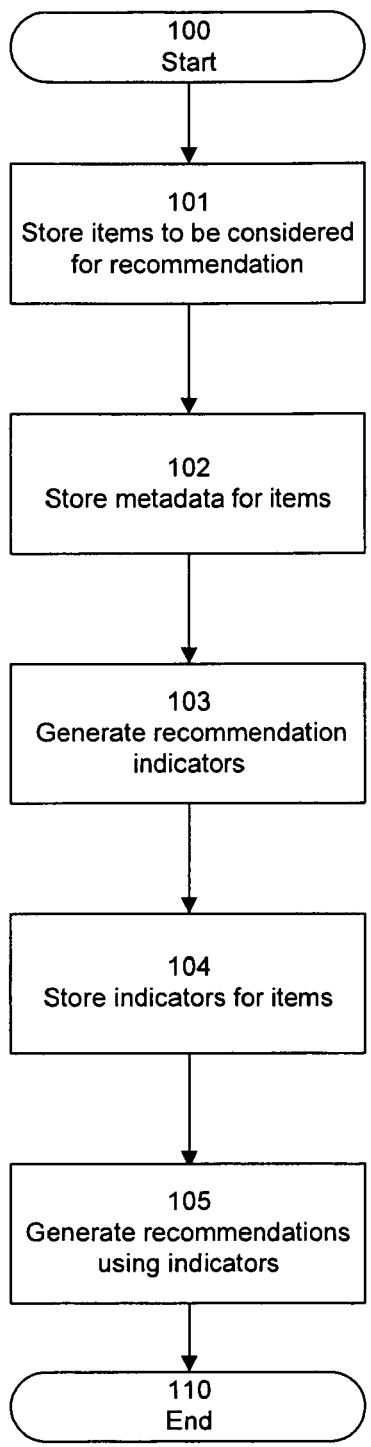
FIG. 1 is a flow chart depicting a method of operation for the present invention according to one embodiment.
Figure 3:
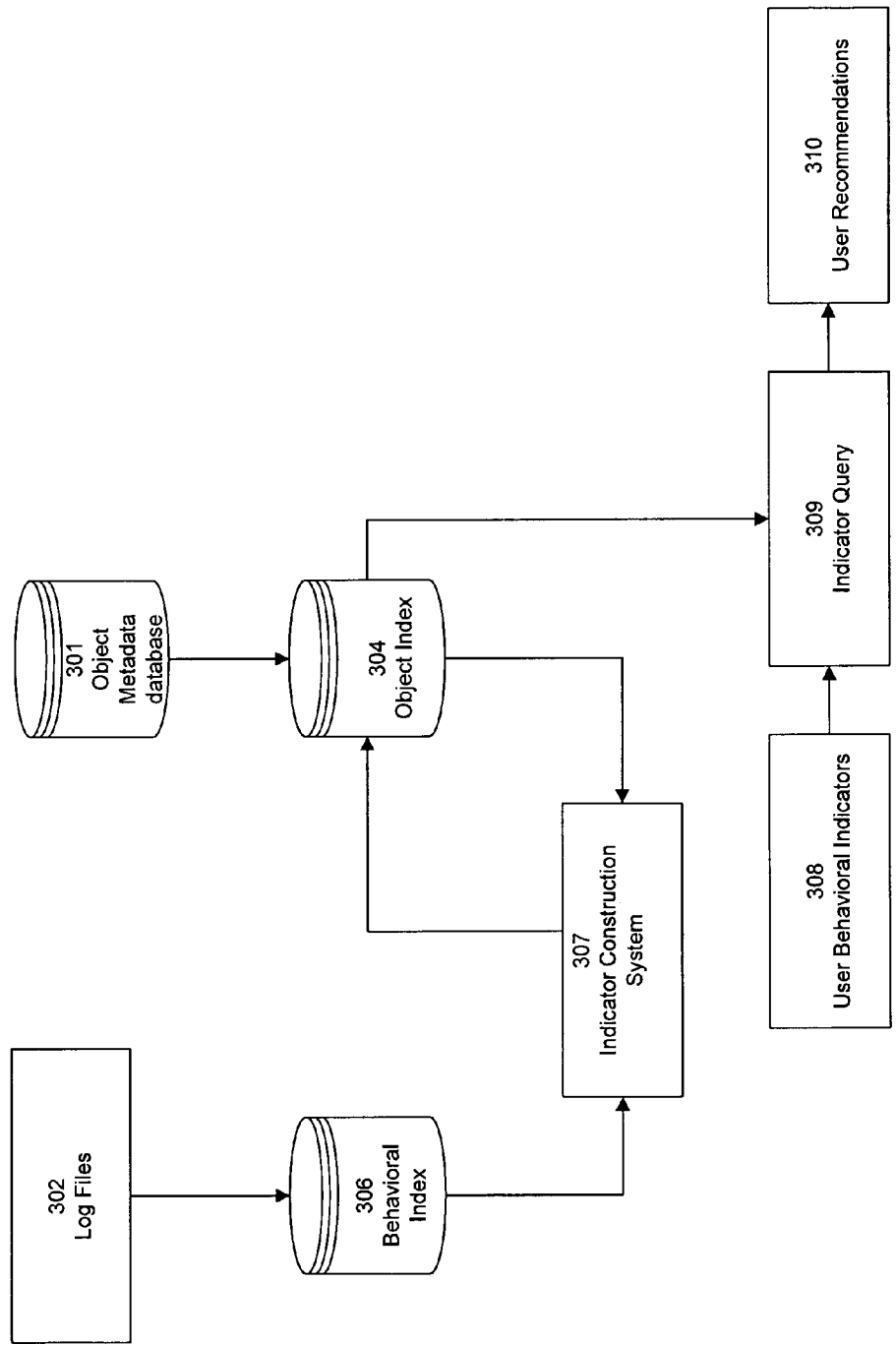
FIG. 3 is a block diagram depicting functional components for implementing the present invention according to one embodiment.

Referring now to FIG. 1, there is shown a flow chart depicting a method of operation for the present invention according to one embodiment. Referring also to FIG. 3, there is shown a set of functional components for implementing the present invention according to one embodiment.

In the indicator-based recommendation system of the present invention, items to be considered for recommendation are stored 101, for example in a conventional text retrieval system or relational database, referred to in FIG. 3 as an object metadata database 301. Conventional metadata such as title and description are also stored 102 in database 301. The system analyzes and/or observes 103 evidence of usage patterns and other behavior of users stored in log files 302 or other records of behavior. Database 301 and log files 302 may in one embodiment be implemented as elements of database 200. Metadata from database 301 are imported into an object index 304, and behavioral data from log files 302 are imported into a behavioral index 306 containing histories of behaviors indexed by user. An indicator construction system 307, which in one embodiment is a component of behavior analysis module 201, uses the behavioral index 306 and the object index 304 to generate 103 recommendation indicators; these indicators are then stored 104 in the object index 304.

In one embodiment, where in the invention operates in the context of a dyadic system, recommendation indicators are generated 103 by an examination of the co-occurrence matrix T'T looking for a sparse representation that retains those elements of co-occurrence that appear to be significant, but strictly limiting the number of non-zero elements. Rows of this sparse version co-occurrence matrix are then stored 104 in the object index 304 as recommendation indicators. The matrix rows can be attached to the items as meta-data so as to closely relate the recommendation indicators with the associated items.

One skilled in the art will recognize that step 103 can be performed simultaneously with other steps, and can continue to be performed as recommendation indicators are accumulated and refined. Thus, the process of deriving recommendation indicators is ongoing even as the system is in operation generating recommendations. Over time, users' interactions with items yield larger accumulations of actual and/or virtual recommendation indicators.

In one embodiment, the indicators constructed by the indicator construction system 307 in step 103 take the form of symbols, encoded for example as integers. These symbols can be identifiers associated with objects in the object index 304 (known as actual indicators), or they can be synthetic identifiers that are not associated with any object or user (known as virtual indicators).

Once some indicators have been generated 103 and stored 104 in the object index 304, the system is capable of generating recommendations for a user. In one embodiment, recommendations are generated 105 by using the user's accumulated recommendation indicators 308 to form a query 309 against the items stored in the object index 304 particularly using the recommendation indicator field stored in the object index 304 by the indicator construction system 307. This query 309 can be resolved using conventional text retrieval techniques, and user recommendations 310 are thereby generated.

The indicator-based method of the present invention provides several advantages over item-based recommendations. For example, item-based recommendations make use of the columns of the sparse version of the co-occurrence matrix and store a list of items on each item. At recommendation time, these lists are merged. In indicator-based recommendations, by contrast, rows of the sparse co-occurrence matrix are used and the non-zero elements are dispersed on a number of different database entries instead of being collected on a single entry as in item-based recommendation. Thus, indicator-based recommendation systems make use of very different data structures and recommendation processes. Instead of retrieving and then merging lists of related items as in item-based recommendations, indicator-based recommendation proceeds by directly searching for items with indicators of interest. Since the meta-data for the recommended items must normally be retrieved in any case, this results in considerably fewer retrieval requests for the item meta-data storage layer than with item-based recommendation systems.

Figure 4:
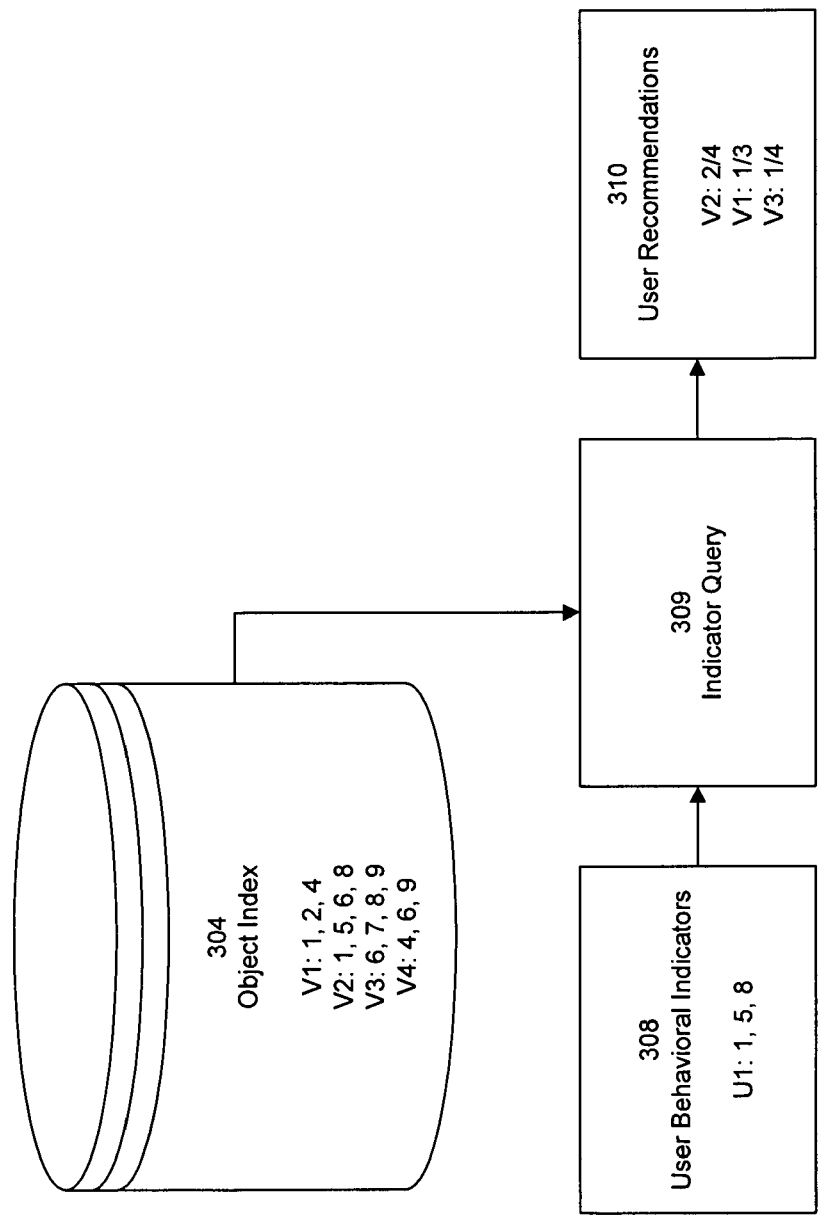
FIG. 4 is a block diagram depicting an example of operation of the pre-sent invention according to one embodiment.

Referring now to FIG. 4, there is shown a block diagram depicting an example of operation of the present invention according to one embodiment. In the example, object index 304 includes records describing four videos V1, V2, V3, and V4. Each record has a set of indicators describing the corresponding video, as shown in the diagram. To generate recommendations for user U1 having behavioral indicators 308 of 1, 5, and 8, a query 309 is generated on the object index 304 using the user behavioral indicators 308. The result is a set of user recommendations 310 that consists of scored references to videos V2, V1 and V3. The user behavioral indicators 308 match two of the four indicators for V2, one of the three indicators for V1, and one of the four indicators for V3. For illustrative purposes only, the example depicts a very simple scoring using the proportion of indicators on the video that were found in the query to rank the user recommendations 310. However, one skilled in the art will recognize that more complex weighting schemes could also be used, as are well known in text retrieval systems. In addition, the object index 304 can be implemented using a text retrieval system, wherein retrieval is based on indicators instead of conventional text.

Furthermore, in item-based recommendations, the list of related items is necessarily a list of items that can be recommended. In general, conventional systems using item-based methodologies do not allow for recommendations with respect to an abstracted list of properties. In the indicator-based methodology of the present invention, the indicators can be item identifiers and/or indicators of any properties of the set of users involved in the co-occurrent interaction of users with items.

One example of user data can be propagated to items as indicators is the examination of query histories of users who have interacted with pairs of items. Those query terms that are over-represented in the users who have interacted with both items can be propagated to the items as recommendation indicators.

Another advantage of indicator-based recommendations is that indicators can be derived from multiple kinds of interaction, while permitting different sources of indicators to all be used in a single query at recommendation time. Text retrieval systems that provide statistical weighting of query terms can therefore be used to efficiently combine multiple kinds of indicators into a coherent recommendation.

Click-Based Augmentation of Recommendation Indicators

In step 103, user interactions and behaviors are analyzed to generate recommendation indicators, for example by detecting a user interaction with an item and storing meta-data about the user as a recommendation indicator for the item. Examples of such recommendation indicators can include lists of other items with which the user has recently interacted, demographic information about the user, and/or a unique identifier for the user him- or herself.

In the context of displaying similar items based on a combination of searches on meta-data and recommendation indicators, this has the effect of raising the score of the clicked item. Specifically, the indicators in the search query will be added to the indicators on the item that is clicked. This replication of these indicators will cause that item to have a higher score in the future when the same or similar query is used. This has the effect of decreasing the average rank of clicked items (that is, moving the clicked items toward the head of the results list). The use of click data in this way in the context of displaying similar items can thus have an effect on recommendations because the indicators added by clicking on similar items can be used in recommendations. This is an example of how indicator-based systems can produce p-adic recommendations.

Click-Based Meta-Data for Search

In one embodiment, when a user initiates a search by entering a query, results are presented, based on recommendations generated by the system of the present invention, and also based on the query terms entered by the user. In one embodiment, if the user then clicks on one of the displayed result items, the search query used to find the item is attached to the item itself as an additional meta-data field or indicator. This has the effect of raising that item in the results list when searches using some or all of the same terms are done by other users. Over time, this adaptation will move items that are likely to be selected in response to particular searches to the top of the search results because items that have often been clicked on by users in the context of a query will be scored more highly by the retrieval engine due to the meta-data added as a result of users clicking. The fact that users clicked on an item in a particular context in the past is a good indicator of whether they will click on it in the future so raising these items in the search list via the additional meta-data has the effect of causing items that are likely to be clicked to appear early in the search results.

For example, suppose that the recommendation system has an associated search system that allows users to type queries that are used to search an index containing entries with the meta-data associated with videos. The metadata includes title and description and a "recorded query" field. Searches are directed against all three fields, but initially only titles and descriptions contribute to the results. Since title and descriptions are often not particularly accurate meta-data, especially with user contributed content, it is likely that some videos that are highly relevant to a particular search will not be returned with a high rank, but instead may be on the second page of results. Most users will not have the persistence to look deeply into the results, but it is likely that a few will be persistent enough to find these highly relevant but poorly ranked videos. As soon as a user finds this video and clicks on it, the index is updated and the search query used to find the video will be added to the "recorded query" field. The next time a user uses terms from that same query, the search system will give the video a much higher score and it will appear earlier in the search results.

This adaptive search capability is useful in that it improves the search system by elevating relevant items according to user behaviors. In addition, the present invention allows these recorded query terms to be used directly as recommendation indicators, or they can be used in an off-line process to assign recommendation indicators to items by using the meta-data (particularly including the collected meta-data) to search for textually related items.

Propagation of Meta-Data and Indicators Across Behavioral and Structural Links

In one embodiment, the present invention facilitates propagation of meta-data from an item to other items based on an observation that the same user tends to click on the items, or based on other observed links among the items. Such meta-data can include, for example, title, description, and recommendation indicators, and the like. For example, all videos in a series can propagate their titles and descriptions to other videos in the same series and to the series itself. Similarly, meta-data from one video can be propagated to other videos that have that video has a recommendation indicator. This propagated meta-data can be weighted more weakly than original meta-data to avoid confusion.

By providing for such propagation of meta-data, the present invention improves search recall. Recall for textual video search is often very poor because little meta-data is available from the publisher of the video. Adding meta-data from videos from the same series or publisher or which have similar viewership can increase recall simply because the original meta-data is so sparse. This has the unfortunate side effect of decreasing recall, but click-based adaptation of search can be used to recover high precision.

Series Recommendation

When it is desirable to produce series recommendations, it is often useful to produce a list of recommended items and then to reduce that list of items to a list of series by traversing the list of recommended items in order of decreasing recommendation strength and recording each series as it is first mentioned in the list of items. For example, if videos v1 through v10 are recommended and these videos belong respectively to series s1, s2, s1, s2, s1, s4, s3, s5, s3, s4, a series recommendation of s1, s2, s4, s3, s5 can be produced by taking the series mentioned in the order that they first appeared in the video recommendation list.

In some cases, a series may have a single highly-placed item in a recommendation list, but otherwise not be particularly good to recommend as whole. Recommending the series highly based on that single video's relevance would not be advisable since the series is not a particularly good recommendation as a whole. To avoid problems of this sort, one option is to record each series the n-th time any item from the series is mentioned in the original item recommendation list. Where n=1, the entire series will be recommended the first time any item from the series is recommended. Where n>1, it is useful to first collect the n-th mention of all series that are mentioned at least n times, then to collect those series that are mentioned n−1 times in the order of their last mention and so on until all series mentioned in the original item recommendation list have been copied to the series recommendation. Taking the previous example, where videos belong to series s1, s2, s1, s2, s1, s4, s3, s5, s3, s4, for n=2, we would produce a series recommendation of s1, s2, s3, s5, s4, where s3 now appears before s4 and s5, because two videos from s3 were found before two were found from either s4 and s5. Furthermore, s5 appears ahead of s4 because neither had two videos in the original list, but s5 had the higher ranked single video.

Anti-Flood Score Adjustment

It is common for a recommendation list to contain many items that are very similar to each other. This tends to decrease the likelihood that at least one item will be selected by the user since the likelihood that any of these items will be selected is so strongly correlated that providing a multiplicity of similar items does not appreciably increase the likelihood of providing a good recommendation.

In one embodiment, the present invention mitigates this problem by examining a recommendation list in order of decreasing score and producing a new recommendation list in which each item has a score that is the original score plus an score adjustment that is dependent on the particular item as well as all items that had an original recommendation score higher than the particular item. The adjustment is defined to be large and negative if there are too many items in the list of items with higher score that are very similar to the particular item.

As an example, if all recommended items have an original score in the range from 0 to 1, then a reasonable score adjustment can be chosen to be −1 if the list of items with higher score has more than 2 items from the same series, or 3 items from the same publisher. The effect of this adjustment when viewing items ordered by descending adjusted score is that the first items seen will have a larger degree of diversity than in the original list since the redundant items will be pushed to the end of the list. The effect is particularly apparent when the list of recommended items is viewed a page at a time since the items with large score adjustments will not be visible at all if the first few pages are viewed.

Another possible adjustment score is to use meta-data on the item being adjusted including things like title and description and recommendation indicators to form a weighted comparison score against all items with higher original scores. The negative of the largest or n-th largest such comparison score can then be used as an adjustment score.

This same technique can be used for any list of items that have associated scores such as results of a search.

Indicators for Indexing Latent Variable Systems

In a latent variable based recommendation engine, the various kinds of objects that are involved in the system are normally represented by relatively low-dimensional real-valued vectors that are subject to a normalization constraint. In latent semantic analysis (LSA), the normalization is done using the $L_2$ norm, while in most probabilistic settings such as LDA, DCA or pLSI, the latent variables are interpreted as multinomial coefficients that must sum to 1. In all of these cases, however, the fundamental comparison between objects is implemented as a sum of products.

Unfortunately, this approach can lead to performance problems when large numbers of items must be compared, since there is no effective way to do this other than to compute the sum of products for every pair of objects that might be of interest. When querying against millions of objects, this can require hundreds of millions of floating point operations.

Other kinds of recommendation engines such as an indicator-based system can be implemented using indexes so that only a small number of scores need to be computed. Conventional reduced dimensional systems are not able to make use of indexes and thus have been subject to performance difficulties. It is desirable that reduced dimensional systems such as LSA be able to take advantage of the benefits of indexes as well.

In one embodiment, the present invention uses an indexed structure to implement a reduced dimensionality sum of products scoring system. This combines the benefits of indexed retrieval, particularly the fact that an indexed retrieval can be done using standard text retrieval software with the benefits of reduced dimensional systems, notably including significantly higher recall while retaining high precision.

In order to implement this, each component of the reduced dimension vector representation is assigned a number of tokens. For instance, if the real-valued components of the reduced dimension vector representation is represented by $x=(x_1 \ldots x_n)$, the i-th component would have some number m of tokens associated with it. One way of encoding the components of the vector is to assign one token to each bit of a fixed precision binary representation of the different components. If the precision of the representation is taken to be 8 bits, then there would be 8 "bit symbols" $b_{i0} \ldots b_{ij}$, $i=0 \ldots 7$ for component i. If the weights of these symbols are set to $2^j$, then a conventional vector-based text retrieval engine will produce the same score (to 8 bits of precision) when comparing a query and item represented by bit symbols as when comparing a query and item represented by the original real-valued vector. This replication of the original score allows the reduced dimension system to be implemented using indexes.

Another way of encoding the components of the vector is to pick a vocabulary size (typically 20 or more times the size of the reduced dimension vector representation) and to start with no tokens assigned to each item. Then pairs of items are repeatedly sampled at random and if the score produced by comparing the sets of tokens for the two items using conventional text retrieval weighting is lower than the sum of products score computed using the reduced dimensional vector representation, a token chosen at random from the vocabulary is assigned to both items. If the score is too large, some token that the two items have in common is chosen at random and removed from one of the two items. This process will eventually produce a token assignment for each item that mirrors the sum of products scores. As an enhancement, the initial tokens can be taken as the original meta-data terms that the reduced representation is derived from and the adaptation process started from that point using synthetic terms that were not in the original meta-data.

In a similar vein, all items can start with a random collection of indicators. Each time a behavior is observed involving a pair or larger tuple of items, the indicators from each item can be moved at random to the other items involved in the behavior. If the proportion of indicators moved starts at a large fraction and decreases with the number of interactions that each item has been involved in, it can be shown that the proportion of indicators shared is an approximation of the probabilistic matrix decomposition describing the behaviors. Put another way, the matrix decomposition of occurrence matrices can be approximated using matrices containing only zeros and ones. This binary decomposition can then be used in all the ways that any indicator-based recommendation system can be used.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a de-sired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for generating recommendations, comprising:
   storing, at an electronic storage device, a plurality of items;
   for each item, storing metadata;
   at an electronic computing device, analyzing behavior of at least one user with respect to at least one of the stored items;
   for at least one of the stored items:
      at an electronic computing device, deriving indicators from the observed behavior; and
      storing the derived indicators; and
   generating at least one recommendation based on the stored indicators;
   wherein deriving indicators from the observed behavior comprises:
      importing stored metadata into an object index;
      importing behavioral data from a stored log file into a behavioral index; and
      generating indicators based on the object index and the behavioral index.

2. The computer-implemented method of claim 1 wherein each item comprises one selected from the group consisting of:
   a document;
   a product;
   a word;
   a musical work;
   an audiovisual work;
   a content item;
   a website; and
   a web page.

3. The computer-implemented method of claim 1 wherein analyzing behavior of at least one user with respect to at least one of the stored items comprises analyzing at least one selected from the group consisting of:
   at least one purchase of at least one of the stored items;
   at least one download of at least one of the stored items;
   at least one exposure to at least one of the stored items;
   at least one visit to at least one website.

4. The computer-implemented method of claim 1 wherein storing the plurality of items comprises storing the plurality of items in a text retrieval system.

5. The computer-implemented method of claim 1 wherein storing the plurality of items comprises storing the plurality of items in a relational database.

6. The computer-implemented method of claim 1 wherein storing metadata comprises storing at least one of a title and a description of an item.

7. The computer-implemented method of claim 1 wherein analyzing behavior of at least one user comprises analyzing behavior indicated by a stored $loc_i$ file comprising usage patterns with respect to at least one of the stored items.

8. The computer-implemented method of claim 1, wherein storing the derived indicators comprises storing the derived indicators in the object index.

9. The computer-implemented method of claim 1, wherein generating indicators based on the object index and the behavioral index comprises:
   constructing a co-occurrence matrix representing observed behavior; and
   generating a sparse version of the co-occurrence matrix by retaining a subset of elements and limiting non-zero elements.

10. The computer-implemented method of claim 1, wherein generating at least one recommendation comprises:
    forming a query against the object index, based on previous recommendation indicators associated with a user; and
    obtaining a result comprising a set of user recommendations,
    wherein the user recommendations comprise scored references to items.

11. A computer-implemented method for generating recommendations, comprising:
    storing, at an electronic storage device, a plurality of items;
    for each item, storing metadata;
    at an electronic computing device, analyzing behavior of at least one user with respect to at least one of the stored items;
    for at least one of the stored items:
       at an electronic computing device, deriving indicators from the observed behavior; and
       storing the derived indicators; and
    generating at least one recommendation based on the stored indicators;
    wherein storing metadata comprises:
       receiving a query from a user;
       displaying results for the query, the results comprising a set of items;
       receiving user selection of at least one of the items; and
       storing metadata for the selected at least one item, wherein the metadata is representative of the received query.

12. A computer-implemented method for generating recommendations, comprising:
    storing, at an electronic storage device, a plurality of items;
    for each item, storing metadata;
    at an electronic computing device, analyzing behavior of at least one user with respect to at least one of the stored items;
    for at least one of the stored items:
       at an electronic computing device, deriving indicators from the observed behavior; and
       storing the derived indicators; and
    generating at least one recommendation based on the stored indicators;
    wherein storing metadata comprises:
       identifying a positive correlation between user selections of a first item and a second item; and
       propagating metadata by copying metadata associated with the first item to the second item.

13. The computer-implemented method of claim 12, further comprising weighting propagated metadata according to the degree of the positive correlation.

14. A computer-implemented method for generating recommendations, comprising:
- storing, at an electronic storage device, a plurality of items;
- for each item, storing metadata;
- at an electronic computing device, analyzing behavior of at least one user with respect to at least one of the stored items;
- for at least one of the stored items:
- at an electronic computing device, deriving indicators from the observed behavior; and
- storing the derived indicators; and
- generating at least one recommendation based on the stored indicators;
- wherein generating at least one recommendation comprises:
  - for at least two items belonging to a series, reducing a plurality of recommendations for the items to a recommendation for the series.

15. A computer-implemented method for generating recommendations, comprising:
- storing, at an electronic storage device, a plurality of items;
- for each item, storing metadata;
- at an electronic computing device, analyzing behavior of at least one user with respect to at least one of the stored items;
- for at least one of the stored items:
- at an electronic computing device, deriving indicators from the observed behavior; and
- storing the derived indicators; and
- generating at least one recommendation based on the stored indicators;
- wherein generating at least one recommendation comprises:
  - deriving an initial score for at least one item;
  - for at least a subset of the at least one item, adjusting the initial score based on scores of at least one other item having a higher score than the initial score of the item.

16. A system for generating recommendations, comprising:
- a storage device, for storing a plurality of items and, for each item, storing metadata;
- a behavior analysis module, for analyzing behavior of at least one user with respect to at least one of the stored items;
- an indicator construction system, for, for at least one of the stored items, deriving indicators from the observed behavior; and
- a recommendation generator, for generating at least one recommendation based on the derived indicators;
- wherein the indicator construction system derives indicators from the observed behavior by:
  - importing stored metadata into an object index;
  - importing behavioral data from a stored log file into a behavioral index; and
  - generating indicators based on the object index and the behavioral index; and
- wherein the storage device stores the derived indicators for at least one of the stored items.

17. The system of claim 16 wherein each item comprises one selected from the group consisting of:
- a document;
- a product;
- a word;
- a musical work;
- an audiovisual work;
- a content item;
- a website; and
- a web page.

18. The system of claim 16 wherein the behavior analysis module analyzes at least one selected from the group consisting of:
- at least one purchase of at least one of the stored items;
- at least one download of at least one of the stored items;
- at least one exposure to at least one of the stored items;
- at least one visit to at least one website.

19. The system of claim 16 wherein the metadata comprises at least one of a title and a description of an item.

20. The system of claim 16 wherein behavior analysis module analyzes behavior indicated by a stored log file comprising usage patterns with respect to at least one of the stored items.

21. The system of claim 16, wherein the indicator construction system generates indicators by:
- constructing a co-occurrence matrix representing observed behavior; and
- generating a sparse version of the co-occurrence matrix by retaining a subset of elements and limiting non-zero elements.

22. The system of claim 16, wherein the recommendation generator generates at least one recommendation by:
- forming a query against the object index, based on previous recommendation indicators associated with a user; and
- obtaining a result comprising a set of user recommendations, wherein the user recommendations comprise scored references to items.

23. The system of claim 16 further comprising:
- an input device, for receiving a query from a user; and
- an output device, for displaying results for the query, the results comprising a set of items;
- wherein:
  - the input device receives user selection of at least one of the items; and
  - the storage device stores metadata for the selected at least one item,
  - wherein the metadata is representative of the received query.

24. A system for generating recommendations, comprising:
- a storage device, for storing a plurality of items and, for each item, storing metadata;
- a behavior analysis module, for analyzing behavior of at least one user with respect to at least one of the stored items;
- an indicator construction system, for, for at least one of the stored items, deriving indicators from the observed behavior; and
- a recommendation generator, for generating at least one recommendation based on the derived indicators;
- wherein, for at least two items belonging to a series, the recommendation generator reduces a plurality of recommendations for the items to a recommendation for the series;
- and wherein the storage device stores the derived indicators for at least one of the stored items.

25. A system for generating recommendations, comprising:
- a storage device, for storing a plurality of items and, for each item, storing metadata;
- a behavior analysis module, for analyzing behavior of at least one user with respect to at least one of the stored items;
- an indicator construction system, for, for at least one of the stored items, deriving indicators from the observed behavior; and a recommendation generator, for generating at least one recommendation based on the derived indicators;
wherein the recommendation generator generates at least one recommendation by:
  deriving an initial score for at least one item;
  for at least a subset of the at least one item, adjusting the initial score based on scores of at least one other item having a higher score than the initial score of the item;
  and wherein the storage device stores the derived indicators for at least one of the stored items.

26. A computer program product for generating recommendations, comprising:
  a non-transitory computer-readable medium; and
  computer program code, encoded on the medium, for:
  storing a plurality of items;
  for each item, storing metadata;
  analyzing behavior of at least one user with respect to at least one of the stored items;
  for at least one of the stored items:
  deriving indicators from the observed behavior; and
  storing the derived indicators; and
  generating at least one recommendation based on the stored indicators;
wherein the computer program code for deriving indicators from the observed behavior comprises computer program code for:
  importing stored metadata into an object index;
  importing behavioral data from a stored log file into a behavioral index; and
  generating indicators based on the object index and the behavioral index.

27. The computer program product of claim 26 wherein the computer program code for analyzing behavior of at least one user with respect to at least one of the stored items comprises computer program code for analyzing at least one selected from the group consisting of:
  at least one purchase of at least one of the stored items;
  at least one download of at least one of the stored items;
  at least one exposure to at least one of the stored items;
  at least one visit to at least one website.

28. The computer program product of claim 26 wherein the computer program code for storing metadata comprises computer program code for storing at least one of a title and a description of an item.

29. The computer program product of claim 26 wherein the computer program code for analyzing behavior of at least one user comprises computer program code for analyzing behavior indicated by a stored log file comprising usage patterns with respect to at least one of the stored items.

30. The computer program product of claim 26, wherein the computer program code for storing the derived indicators comprises computer program code for storing the derived indicators in the object index.

31. The computer program product of claim 26, wherein the computer program code for generating indicators based on the object index and the behavioral index comprises computer program code for:
  constructing a co-occurrence matrix representing observed behavior; and
  generating a sparse version of the co-occurrence matrix by retaining a subset of elements and limiting non-zero elements.

32. The computer program product of claim 26, wherein the computer program code for generating at least one recommendation comprises computer program code for:
  forming a query against the object index, based on previous recommendation indicators associated with a user; and
  obtaining a result comprising a set of user recommendations,
  wherein the user recommendations comprise scored references to items.

33. The computer program product of claim 26 wherein the computer program code for storing metadata comprises:
  computer program code for receiving a query from a user;
  computer program code for displaying results for the query, the results comprising a set of items;
  computer program code for receiving user selection of at least one of the items; and
  computer program code for storing metadata for the selected at least one item, wherein the metadata is representative of the received query.

34. A computer program product for generating recommendations, comprising:
  a non-transitory computer-readable medium; and
  computer program code, encoded on the medium, for:
  storing a plurality of items;
  for each item, storing metadata;
  analyzing behavior of at least one user with respect to at least one of the stored items;
  for at least one of the stored items:
  deriving indicators from the observed behavior; and
  storing the derived indicators; and
  generating at least one recommendation based on the stored indicators;
wherein the computer program code for storing metadata comprises:
  computer program code for identifying a positive correlation between user selections of a first item and a second item; and
  computer program code for propagating metadata by copying metadata associated with the first item to the second item.

35. The computer program product of claim 34, further comprising computer program code for weighting propagated metadata according to the degree of the positive correlation.

36. A computer program product for generating recommendations, comprising:
  a non-transitory computer-readable medium; and
  computer program code, encoded on the medium, for:
  storing a plurality of items;
  for each item, storing metadata;
  analyzing behavior of at least one user with respect to at least one of the stored items;
  for at least one of the stored items:
  deriving indicators from the observed behavior; and
  storing the derived indicators; and
  generating at least one recommendation based on the stored indicators;
wherein the computer program code for generating at least one recommendation comprises:
  computer program code for, for at least two items belonging to a series, reducing a plurality of recommendations for the items to a recommendation for the series.

37. A computer program product for generating recommendations, comprising:
  a non-transitory computer-readable medium; and
  computer program code, encoded on the medium, for:
  storing a plurality of items;
  for each item, storing metadata;
  analyzing behavior of at least one user with respect to at least one of the stored items;
  for at least one of the stored items:
  deriving indicators from the observed behavior; and storing the derived indicators; and
generating at least one recommendation based on the stored indicators;
wherein the computer program code for generating at least one recommendation comprises:
computer program code for deriving an initial score for at least one computer program code for, for at least a subset of the at least one item, is adjusting the initial score based on scores of at least one other item having a higher score than the initial score of the item.

* * * * *

UNITED STATES PATENT AND TRADEMARK OFFICE
CERTIFICATE OF CORRECTION

| | |
|---|---|
| PATENT NO. | : 8,156,059 B2 |
| APPLICATION NO. | : 12/023597 |
| DATED | : April 10, 2012 |
| INVENTOR(S) | : Ted E. Dunning and Raza Amir Mobin |

It is certified that error appears in the above-identified patent and that said Letters Patent is hereby corrected as shown below:

Column 16, line 6 (claim 7), replace "stored loci," with --stored log--

Signed and Sealed this
Fifteenth Day of May, 2012

David J. Kappos
*Director of the United States Patent and Trademark Office*